United States Patent
Inoue et al.

(10) Patent No.: US 11,414,162 B2
(45) Date of Patent: Aug. 16, 2022

(54) CONTROL SYSTEM FOR MARINE VESSEL, MARINE VESSEL, AND CONTROL METHOD FOR MARINE VESSEL

(71) Applicant: YAMAHA HATSUDOKI KABUSHIKI KAISHA, Iwata (JP)

(72) Inventors: Hiroshi Inoue, Iwata (JP); Jun Nakatani, Iwata (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 67 days.

(21) Appl. No.: 17/029,936

(22) Filed: Sep. 23, 2020

(65) Prior Publication Data

US 2021/0086876 A1   Mar. 25, 2021

(30) Foreign Application Priority Data

Sep. 25, 2019   (JP) .............. JP2019-173742

(51) Int. Cl.
   *B63B 39/06*   (2006.01)
   *G05D 1/08*   (2006.01)
   *B63H 20/10*   (2006.01)

(52) U.S. Cl.
   CPC ......... *B63B 39/061* (2013.01); *G05D 1/0875* (2013.01); *B63H 20/10* (2013.01)

(58) Field of Classification Search
   CPC .... B63B 39/061; G05D 1/0875; B63H 20/10; B63H 21/00; B63H 21/21; B63H 21/213; B63H 21/22
   USPC ........................................... 440/1
   See application file for complete search history.

(56) References Cited

U.S. PATENT DOCUMENTS

| | | | |
|---|---|---|---|
| 5,169,348 A | 12/1992 | Ogiwara et al. | |
| 7,201,620 B2 * | 4/2007 | Kinoshita | B63H 21/21 440/1 |
| 8,092,264 B2 * | 1/2012 | Kinoshita | B63H 21/213 440/1 |
| 2006/0160438 A1 | 7/2006 | Kinoshita et al. | |
| 2007/0293103 A1 | 12/2007 | Kinoshita et al. | |
| 2010/0227516 A1 | 9/2010 | Kinoshita et al. | |

FOREIGN PATENT DOCUMENTS

| | | |
|---|---|---|
| JP | 2006-199136 A | 8/2006 |
| JP | 2010-173447 A | 8/2010 |
| JP | 2013-256261 A | 12/2013 |
| JP | 2016-159680 A | 9/2016 |

\* cited by examiner

*Primary Examiner* — Lars A Olson
(74) *Attorney, Agent, or Firm* — Rabin & Berdo, P.C.

(57) ABSTRACT

A control system for a marine vessel that has a propulsion device including an engine. The control system has an opening angle adjustment device configured to adjust a throttle opening angle of the engine, and a controller including a computing device and a non-transitory storage medium containing program instructions. The execution of the program instructions by the computing device causes the controller to judge whether or not a hull of the marine vessel has entered a planing state, set a predetermined mode in which the planing state is maintained, and upon determining that the predetermined mode is set and that the hull has entered the planing state, control the opening angle adjustment device to keep the hull in the planing state even when the hull has decelerated.

16 Claims, 8 Drawing Sheets

CONTROL SYSTEM FOR MARINE VESSEL, MARINE VESSEL, AND CONTROL METHOD FOR MARINE VESSEL

CROSS REFERENCE TO RELATED APPLICATIONS

This application claims the benefit of priority to Japanese Patent Application No. 2019-173742 filed on Sep. 25, 2019, which is hereby incorporated herein by reference.

BACKGROUND OF THE INVENTION

1. Field of the Invention

The present invention relates to a marine vessel, a control system for the marine vessel, and a control method for the marine vessel.

2. Description of the Related Art

Generally, in a marine vessel, as the speed of a hull increases with increase in the throttle opening angle of an engine in a propulsion device, the hull eventually shifts from a hump state into a planing state. In a case where a sailing speed is equal to or higher than a predetermined speed when it is judged that the hull is in the planing state, a driving control apparatus disclosed in Japanese Laid-open Patent Publication (Kokai) No. 2006-199136 uses this sailing speed as a target sailing speed to control the throttle opening angle.

When, for example, the marine vessel is maneuvered in shallows, the hull is required to plane as slowly as possible. However, if the throttle opening angle becomes too small, the hull cannot maintain its planing state, and on the other hand, if the throttle opening angle becomes too large, the speed of the hull becomes too high. It is difficult to manually adjust the throttle opening angle in order to keep the marine vessel planing at low speed.

SUMMARY OF THE INVENTION

The present invention provides a marine vessel, a control system for a marine vessel, and a control method for the marine vessel which are capable of maintaining a planing state of a hull at relatively low speed.

According to an embodiment of the present invention, a control system for a marine vessel, comprising: an opening angle adjustment unit configured to adjust a throttle opening angle of an engine in a propulsion device; and a controller configured to judge whether or not a hull has entered a planing state, set a predetermined mode in which the planing state is maintained, and in a case where the predetermined mode is set and it is judged that the hull has entered the planing state, control the opening angle adjustment unit so as to keep the hull in the planing state even when the hull has decelerated.

According to this arrangement, in a case where the predetermined mode is set and it is judged that the hull has shifted to the planing state, the opening angle adjustment unit is controlled so as to maintain the planing state of the hull even when the hull has decelerated. As a result, the planing state can be maintained at relatively low speed.

Further features of the present invention will become apparent from the following description of preferred embodiments with reference to the attached drawings.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, embodiments of the present invention will be described with reference to the drawings.

Figure 1:
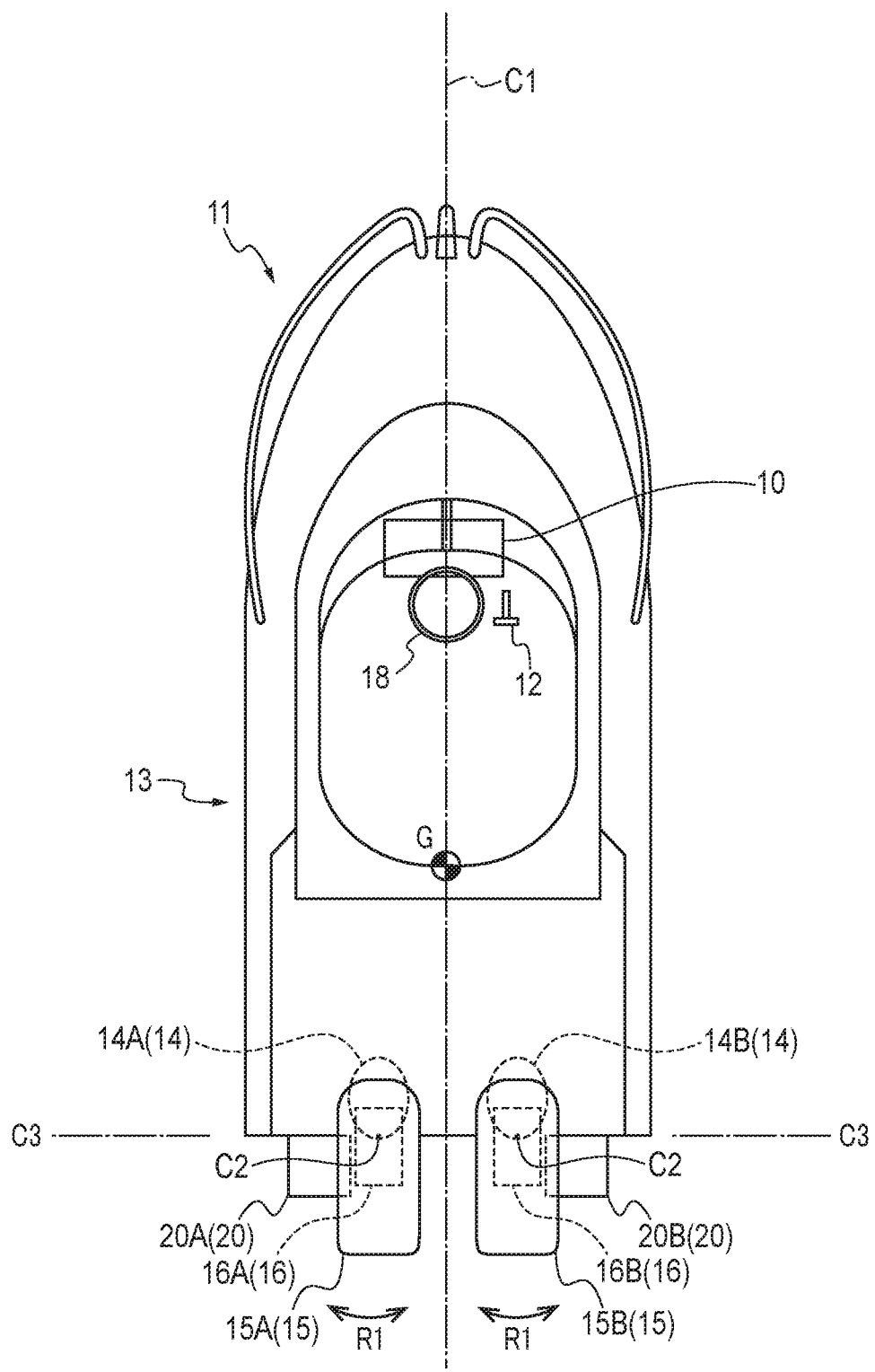
FIG. 1 is a top view of a marine vessel to which a control system for the marine vessel according to a preferred embodiment of the present invention is applied.

First, a description will be given of an embodiment of the present invention. FIG. 1 is a top view of a marine vessel to which a control system for the marine vessel according to the embodiment is applied. The marine vessel 11 has a hull 13, a plurality of (for example, two) outboard motors 15 as marine propulsion devices mounted on the hull 13, and a plurality of (for example, a pair of) trim tabs 20. A central unit 10, a steering wheel 18, and a throttle lever 12 are provided in the vicinity of a cockpit in the hull 13.

In the following description, a fore-and-aft direction, a crosswise direction, and a vertical direction mean a fore-and-aft direction, a crosswise direction, and a vertical direction, respectively, of the hull 13. For example, as shown in FIG. 1, a centerline C1 extending in the fore-and-aft direction of the hull 13 passes through the center of gravity G of the marine vessel 11. The fore-and-aft direction is the direction along the centerline C1. Fore or front means a direction toward the upper side of FIG. 1 along the centerline C1. Aft or rear means the direction toward the lower side of FIG. 1 along the centerline C1. The crosswise direction is defined based on a direction when the hull 13 is viewed from the rear. The vertical direction is a direction vertical to the fore-and-aft direction and the crosswise direction.

The two outboard motors 15 are mounted side by side on a stern of the hull 13. To distinguish the two outboard motors 15, the one located on the port side is referred to as an "outboard motor 15A", and the one located on the starboard side is referred to as an "outboard motor 15B". The outboard motors 15A and 15B are mounted on the hull 13 via respective mounting units 14 (14A and 14B). The outboard motors 15A and 15B have respective engines 16 (16A and 16B) which are internal combustion engines. The outboard motors 15 each obtain a propulsive force from propellers (not illustrated) that are rotated by driving force of the respective engines 16.

Figure 3:
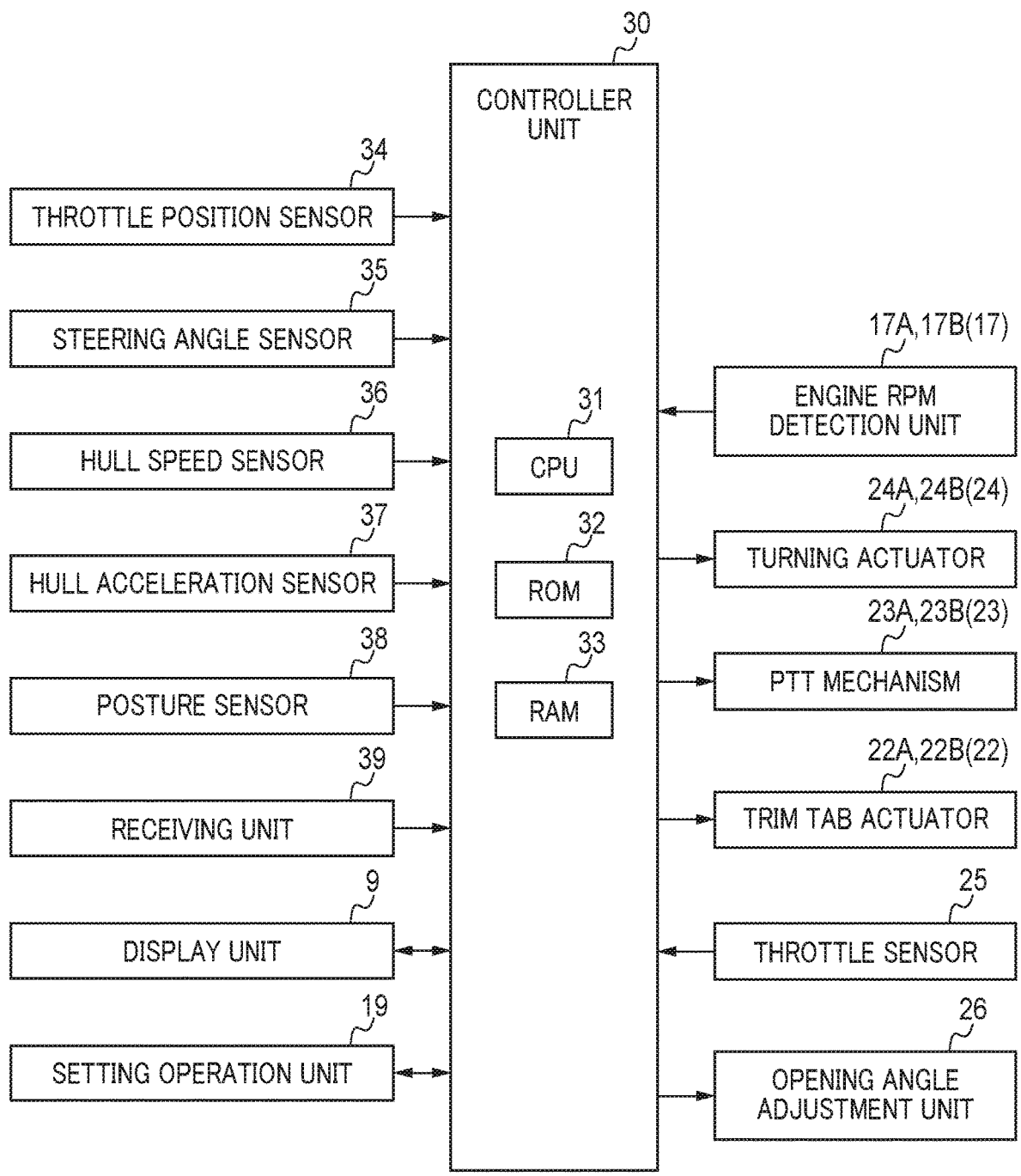
FIG. 3 is a block diagram of a maneuvering system.

The mounting units 14A and 14B each include a swivel bracket, a cramp bracket, a steering shaft, and a tilt shaft (none of them is illustrated). The mounting units 14A and 14B further include respective power trim and tilt mechanisms (PTT mechanisms) 23 (23A and 23B) (FIG. 3). Each of the PTT mechanisms 23 turns the corresponding outboard motor 15 about the tilt shaft. This makes it possible to change an inclination angle of the outboard motors 15 with respect to the hull 13, and hence a trim adjustment can be made, and the outboard motors 15 can be tilted up and down. Moreover, each of the outboard motors 15 is turnable about a center of turn C2 (about the steering shaft) with respect to the swivel bracket. By operating the steering wheel 18, each of the outboard motors 15 is turned about the center of turn C2 in the crosswise direction (direction R1). Thus, the marine vessel 11 is steered.

The pair of trim tabs 20 is attached to the stern on the port side and the starboard side such that it can swing about a swing axis C3. To distinguish the two trim tabs 20 from each other, the one located on the port side is referred to as a "trim tab 20A", and the one located on the starboard side is referred to as a "trim tab 20B".

Figure 2:
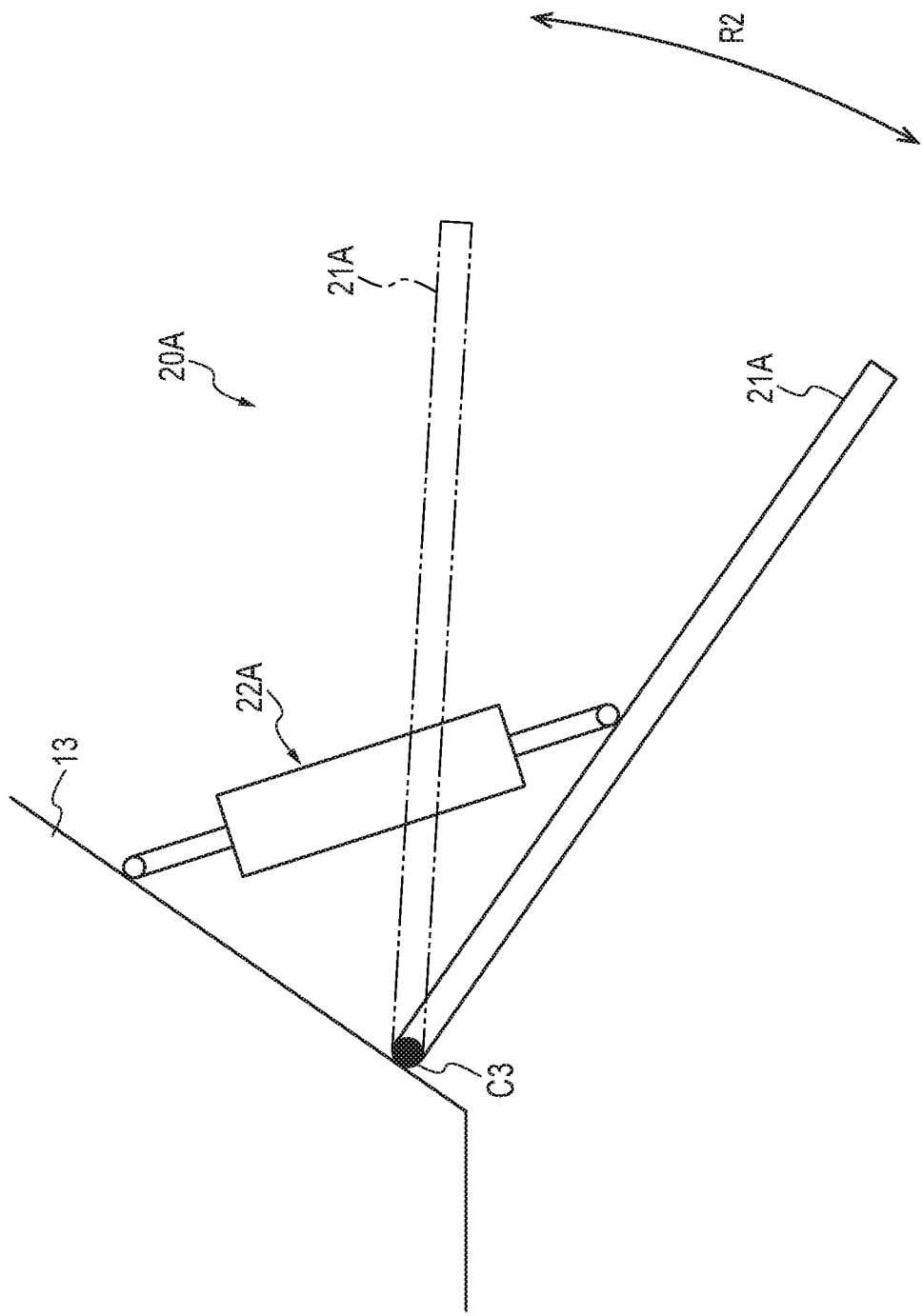
FIG. 2 is a side view of a trim tab attached to a hull.

FIG. 2 is a side view of the trim tab 20A attached to the hull 13. The trim tabs 20A and 20B have the same construction, and hence the construction of only the trim tab 20A will be described. The trim tab 20A has a trim tab actuator 22A and a tab 21A. The tab 21A is attached to the rear of the hull 13 such that it can swing about the swing axis C3. For example, a base end portion of the tab 21A is attached to the rear of the hull 13, and a free end portion of the tab 21A swings up and down (in a swinging direction R2) about the swing axis C3. The tab 21A is an example of a posture control tab that controls the posture of the hull 13.

The trim tab actuator 22A is disposed between the tab 21 and the hull 13 such that it connects the tab 21A and the hull 13 together. The trim tab actuator 22A drives the tab 21A to swing it with respect to the hull 13. It should be noted that the tab 21A indicated by a chain double-dashed line in FIG. 2 is at a position where its free end portion is at the highest level (a position where the amount by which the tabs 21 is lowered by 0%), and this position corresponds to a retracted position. The tab 21A indicated by a solid line in FIG. 2 is at a position where its free end portion is at a lower level than the bottom (keel) of the marine vessel 11. It should be noted that a range where the tab 21A is able to swing is not limited to the one illustrated in FIG. 2. The swinging direction R2 is defined with reference to the swing axis C3. The swing axis C3 is perpendicular to the centerline C1 and parallel to, for example, the crosswise direction. It should be noted that the swing axis C3 may extend diagonally so as to cross the center of turn C2.

FIG. 3 is a block diagram of a maneuvering system. The maneuvering system includes the control system for the marine vessel according to the present embodiment. The marine vessel 11 has a controller unit 30, a throttle position sensor 34, a steering angle sensor 35, a hull speed sensor 36, a hull acceleration sensor 37, a posture sensor 38, a receiving unit 39, a display unit 9, and a setting operation unit 19. The marine vessel 11 also has engine rpm detection units 17 (17A and 17B), turning actuators 24 (24A and 24B), the PTT mechanisms 23 (23A and 23B), the trim tab actuators 22 (22A and 22B) (see FIG. 2 as well). The marine vessel 11 also has a throttle sensor 25 and an opening angle adjustment device (opening angle adjustment unit) 26.

The controller unit 30, the throttle sensor 25, the opening angle adjustment unit 26, the steering angle sensor 35, the hull speed sensor 36, the hull acceleration sensor 37, the posture sensor 38, the receiving unit 39, the display unit 9, and the setting operation unit 19 are included in the central unit 10 or disposed in the vicinity of the central unit 10. The turning actuators 24A and 24B and the PTT mechanisms 23A and 23B are provided for the outboard motors 15A and 15B, respectively. The throttle position sensor 34 and the engine rpm detection units 17 are provided in the respective outboard motor 15. The trim tab actuators 22A and 22B are included in the trim tabs 20A and 20B, respectively.

The controller unit 30 includes a CPU 31, a ROM 32, a RAM 33, and a timer which is not illustrated. The ROM 32 stores a control program. The CPU 31 expands the control program stored in the ROM 32 into the RAM 33 to implement various types of control processes. The RAM 33 provides a work area for the CPU 31 to execute the control program.

Results of detection by the sensors 25 and 34 to 38 and the engine rpm detection units 17 are supplied to the controller unit 30. The throttle sensor 25 detects the operational position of the throttle lever 12 operated. The throttle position sensor 34 detects the opening angle of a throttle valve, which is not illustrated. The opening angle adjustment unit 26 adjusts the opening angle of the throttle valve. In normal control, the CPU 31 controls the opening angle adjustment unit 26 based on the operational position of the throttle lever 12, and when a planing mode (a predetermined mode) (which will be described later) in which a planing state is maintained is applied, controls the opening angle adjustment unit 26 according to situations. Thus, in the planing mode, the operational position of the throttle lever 12 and the actual opening angle of the throttle valve do not always correspond to each other.

The steering angle sensor 35 detects the turn angle of the steering wheel 18 that has been turned. The hull speed sensor 36 and the hull acceleration sensor 37 detect the speed (vessel speed) and the acceleration, respectively, of the marine vessel 11 (the hull 13) while it is traveling.

The posture sensor 38 includes, for example, a gyro sensor, a magnetic direction sensor, and so forth. Based on a signal output from the posture sensor 38, the controller unit 30 calculates a roll angle, a pitch angle, and a yaw angle. It should be noted that the controller unit 30 may calculate the roll angle and the pitch angle based on a signal output from the hull acceleration sensor 37. The receiving unit 39 includes a GNSS (Global Navigation Satellite Systems) receiver such as a GPS and has a function of receiving GPS signals and various types of signals as positional information. A signal received by the receiving unit 39 is supplied to the CPU 31. From a speed restricted area or the ground in its vicinity, an identification signal for providing notification that the area is a speed restricted area is transmitted. The speed restricted area means an area in a harbor or the like which requires to limit the speed of a marine vessel to a predetermined speed or lower. The receiving unit 39 also has a function of receiving the identification signal. It should be noted that the acceleration of the hull 13 may also be obtained from a GPS signal received by the receiving unit 39.

The engine rpm detection units 17 detect the number of revolutions per unit time of the respective engines 16 (hereafter referred to as "the engine rpm"). The display unit 9 displays various types of information. The setting operation unit 19 includes an operator by which a vessel operator performs operations relating to maneuvering, a PTT operation switch, a setting operator by which a vessel operator makes various settings, and an input operator by which a vessel operator inputs various types of instructions (none of them is illustrated).

The turning actuators 24 turn the respective outboard motors 15 about the respective centers of turn C2 with respect to the hull 13. The turns of the outboard motors 15A and 15B about the respective centers of turn C2 can change the direction in which the propulsive force acts on the centerline C1 of the hull 13. The PTT mechanisms 23 turn the respective outboard motors 15 about the tilt shaft to tilt the respective outboard motors 15 with respect to the cramp bracket. The PTT mechanisms 23 are operated by, for example, the PTT operation switch being operated. As a result, the inclination angles of the outboard motors 15 with respect to the hull 13 can be changed.

The trim tab actuators 22A and 22B are controlled by the controller unit 30. For example, the controller unit 30 operates the trim tab actuators 22A and 22B by outputting control signals to them. The operation of each of the trim tab actuators 22A and 22B which are driving units causes the corresponding tab 21 to swing. It should be noted that actuators adopted for the PTT mechanisms 23 or the trim tab actuators 22A and 22B may be either a hydraulic type or an electric type.

It should be noted that the controller unit 30 may obtain results of detection by the engine rpm detection unit 17 via a remote control ECU, which is not illustrated. It should be noted that the controller unit 30 may also control the engines 16 via outboard motor ECUs (not illustrated) provided in the respective outboard motors 15.

A signal output from the posture sensor 38 is also used to detect a turning state. The signal output from the posture sensor 38 includes a yaw rate (yaw turn angular velocity) which is an angular velocity of turn around a yaw axis. Based on the yaw rate output from the posture sensor 38, the CPU 31 judges whether or not a traveling direction of the hull 13 is a straight traveling direction. When the yaw rate is equal to or smaller than a predetermined value, the CPU 31 judges that the traveling direction of the hull 13 is the straight traveling direction, and when the yaw rate is greater than the predetermined value, the CPU 31 judges that the traveling direction of the hull 13 is a turning direction. It should be noted that the CPU 31 may judge whether or not the traveling direction of the hull 13 has changed, based on time-series data on the yaw angle obtained from the magnetic direction sensor of the posture sensor 38. It should be noted that in the present embodiment, it is not absolutely necessary to detect the turning state.

Figure 4:
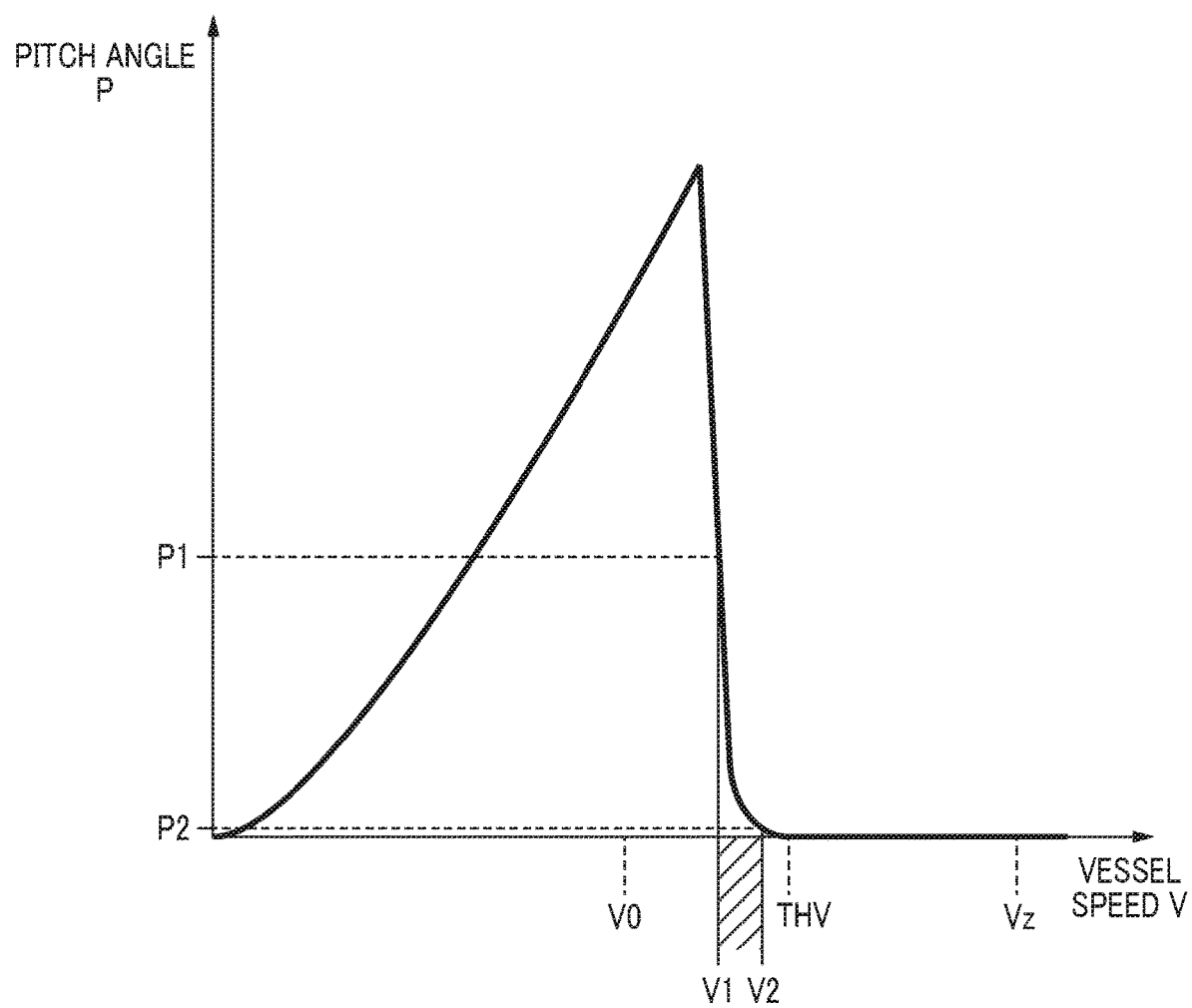
FIG. 4 is a view showing an example of the relationship between vessel speed and pitch angle.

FIG. 4 is a view showing the relationship between vessel speed and pitch angle. The throttle opening angle of the engine 16 in the outboard motor 15 is increased from a stopped state of the hull 13, and the hull 13 reaches high speed, the hull 13 eventually shifts from a hump state to a planing state. Namely, as the vessel speed V obtained by the hull speed sensor 36 increases from zero, the pitch angle P of the hull 13 increases, and then the pitch angle P rapidly decreases. After that, when the vessel speed V further increases and the pitch angle P becomes substantially equal to zero, the planing state of the hull 13 becomes stable.

A state in which the speed of the hull 13 falls within a speed range indicated by diagonal lines in FIG. 4 corresponds to a state in which the hull 13 is in a critical state between a non-planing state and the planing state. In other words, the state in which the speed of the hull 13 falls within the speed range indicated by the diagonal lines in FIG. 4 corresponds to a state in which the hull 13 is in a critical state between a hump state and a planing state. The speed range indicated by the diagonal lines is a range from a critical minimum speed V1 and a critical maximum speed V2. Even in the planing state, when the speed of the hull 13 enters the critical state, there is a possibility that the hull 13 will shift to the non-planing state if the throttle opening angle remains unchanged. It should be noted that in the strict sense, the range where the speed of the hull 13 is in the critical state varies with loads the hull 13 carries and positions of the hull's center of gravity.

A speed V0, which is a predetermined fixed value, is sufficiently higher than zero and lower than a speed at which the hull 13 enters the planing state. A maximum pitch angle P1, which is a maximum pitch angle in the critical state, is a fixed value. A minimum pitch angle P2, which is a minimum pitch angle in the critical state, is a fixed value. The critical minimum speed V1 mentioned above is a speed at which the pitch angle P reaches the maximum pitch angle P1 when the vessel speed V is higher than the speed V0. The critical maximum speed V2 is a speed at which the pitch angle P reaches the minimum pitch angle P2 when the vessel speed V is higher than the speed V0. The speed V0, the maximum pitch angle P1, and the minimum pitch angle P2 are stored in the ROM 32 in advance.

It should be noted that in the present embodiment, it is not absolutely necessary to recognize the critical minimum speed V1. A set speed THV is a speed set at a higher value than the critical maximum speed V2. In the present embodiment, it is not necessary to use the set speed THV. It should be noted that a speed Vz is an example of the vessel speed in the planing state at not-low speed.

When maneuvered in shallows or the like, the hull 13 is required to plane as slowly as possible. However, it is difficult to manually adjust the throttle opening angle so as to keep the planing state at low speed. Thus, as described below with reference to FIG. 5, by using the critical maximum speed V2 substantially as a target value of the vessel speed V, the CPU 31 controls the opening angle adjustment unit 26 so as to keep the planing state.

Figure 5:
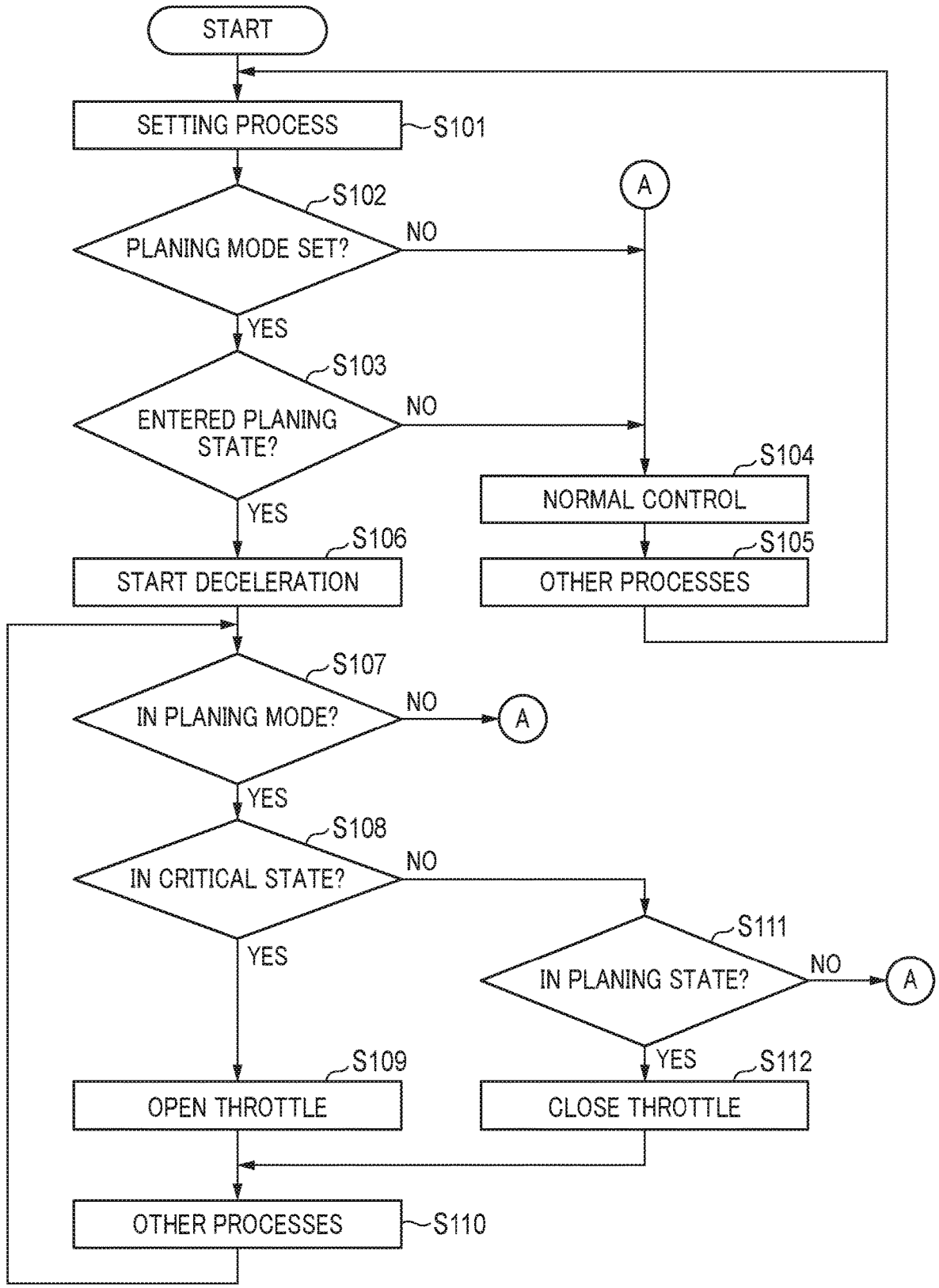
FIG. 5 is a flowchart of a throttle control process.

FIG. 5 is a flowchart of a throttle control process. This process is implemented by the CPU 31 expanding a control program stored in the ROM 32 into the RAM 33 and executing the same. This process is started when, for example, the maneuvering system is activated. In this process, the CPU 31 acts as a control unit of the present invention.

First, in step S101, the CPU 31 carries out a setting process. In the setting process, settings are made based on matters input through the setting operation unit 19. For example, when a user issues an instruction to set the planing mode, in which the planing state is maintained, by operating the setting operation unit 19, the CPU 31 sets the planing mode. In step S102, the CPU 31 determines whether or not the planing mode is set. When the planing mode is not set, the process proceeds to step S104, in which the CPU 31 performs normal control. In the normal control, the CPU 31 controls the opening angle adjustment unit 26 based on the operational position of the throttle lever 12 (throttle operator). Then, in step S105, the CPU 31 carries out other processes, followed by the process returning to the step S101. Here, "other processes" mean various types of processes which are carried out according to, for example, settings made and operations performed with the setting operation unit 19. For example, when an instruction to cancel the planing mode is issued using the setting operation unit 19, the planing mode is canceled. Also, when an instruction to stop the maneuvering system is issued, a process that ends this flowchart is carried out.

As a result of the determination in the step S102, when the planing mode is set, the CPU 31 determines whether or not the hull 13 has entered the planing state. Here, whether or not the hull 13 has entered the planing state is determined according to whether or not the pitch angle P is equal to or smaller than the minimum pitch angle P2 ($P \leq P2$) in a state where the vessel speed V is higher than the speed V0 ($V0 < V$). When the pitch angle P is equal to or smaller than the minimum pitch angle P2 ($P \leq P2$) in a state where the vessel speed V is higher than the speed V0 (V0<V), it is determined that the hull 13 has entered the planing state. As described above, the pitch angle P is obtained based on a signal output from the posture sensor 38.

When the CPU 31 determines in the step S103 that the hull 13 has not entered the planing state, the process proceeds to the step S104. On the other hand, the hull 13 has entered the planing state, the CPU 31 starts decelerating the hull 13 in step S106. Namely, the CPU 31 controls the opening angle adjustment unit 26 so as to reduce the throttle opening angle of the engine 16 by a predetermined amount irrespective of the operational position of the throttle lever 12.

In step S107, the CPU 31 determines whether or not the planing mode is applied, and when the planing mode is not applied, the process proceeds to the step S104. It should be noted that in step S110, which will be described later, the planing mode may be canceled. On the other hand, when the planing mode is applied, the process proceeds to step S108, in which the CPU 31 determines whether or not the hull 13 is in the critical state between the planing state and the non-planing state. Namely, the CPU 31 determines whether or not the hull 13 has shifted from the planing state to the critical state. Here, whether or not the hull 13 is in the critical state is determined based on the vessel speed V and the pitch angle P. Specifically, when the pitch angle P is greater than the minimum pitch angle P2 and equal to or smaller than the maximum pitch angle P1 (P2<P≤P1) in a state where the vessel speed V is higher than the speed V0 (V0<V), it is determined that the hull 13 is in the critical state.

As a result of the determination in the step S108, when the hull 13 is in the critical state, there is a possibility that if nothing is done, the hull 13 will shift to the non-planing state. To avoid that situation, in step S109, the CPU 31 controls the opening angle adjustment unit 26 so as to increase the throttle opening angle of the engine 16 by a predetermined amount irrespective of the operational position of the throttle lever 12. This brings the hull 13 back from the critical state to the low-speed planing state. The CPU 31 proceeds then the process to the step S110.

As a result of the determination in the step S108, when the hull 13 is not in the critical state, the process proceeds to step S111, in which the CPU 31 determines whether or not the hull 13 is in the planing state. As a result of the determination in the step S111, when the hull 13 is in the planing state, the process proceeds to step S112, in which the CPU 31 controls the opening angle adjustment unit 26 so as to reduce the throttle opening angle of the engine 16 by a predetermined amount irrespective of the operational position of the throttle lever 12. As a result, while the planing state is continuing after the start of deceleration, the throttle opening angle gradually decreases, causing the vessel speed V to decrease. Also when the hull 13 has shifted from the critical state to the planing state, the CPU 31 reduces the throttle opening angle of the engine 16 by only the predetermined amount. This prevents the speed of the hull 13 from becoming too high. Thus, the planing state at relatively low speed is maintained. After that, the CPU 31 proceeds the process to the step S110.

As described above, by repeating the steps S109 and S112, the throttle angle is adjusted by using the critical maximum speed V2 substantially as a target speed of the hull 13.

On the other hand, when the CPU 31 determines in the step S111 that the hull 13 is not in the planing state, the CPU 31 proceeds the process to the step S104. Namely, in this case, the hull 13 has entered the non-planing state, and hence control performed by the CPU 31 temporarily returns to the normal control. In the step S110, the CPU 31 carries out other processes as with the step S105, followed by the process returning to the step S107.

It should be noted that even in a case where the planing mode is set in a state where the hull 13 has entered the planing state, the opening angle adjustment unit 26 is controlled in step S112 so as to reduce the throttle opening angle of the engine 16 by the predetermined amount. Thus, by adopting an appropriately small value as this predetermined amount, the hull 13 can be gradually decelerated. It should be noted that the predetermined amounts used in the respective steps S106, S109, and S112 should not necessarily be the same.

According to the present embodiment, when it is judged that the planing mode is set and the hull 13 has entered the planing state, the hull 13 is decelerated. Then, the opening angle adjustment unit 26 is controlled to keep the hull 13 in the planing state even when the hull 13 has been decelerated. Specifically, when it is judged that the hull 13 has shifted from the planing state to the critical state while the planing mode is applied, the opening angle adjustment unit 26 is controlled so as to increase the throttle opening angle. Also, when it is judged that the hull 13 has shifted from the critical state to the planing state, the opening angle adjustment unit 26 is controlled so as to decrease the throttle opening angle. As a result, the vessel speed V is controlled by using the critical maximum speed V2 substantially as a target value, and hence the planing state at relatively low speed can be maintained.

A description will now be given of another embodiment of the present invention. The present embodiment differs from the embodiment firstly described above in its throttle control process, and they are identical in the other features.

Figure 6:
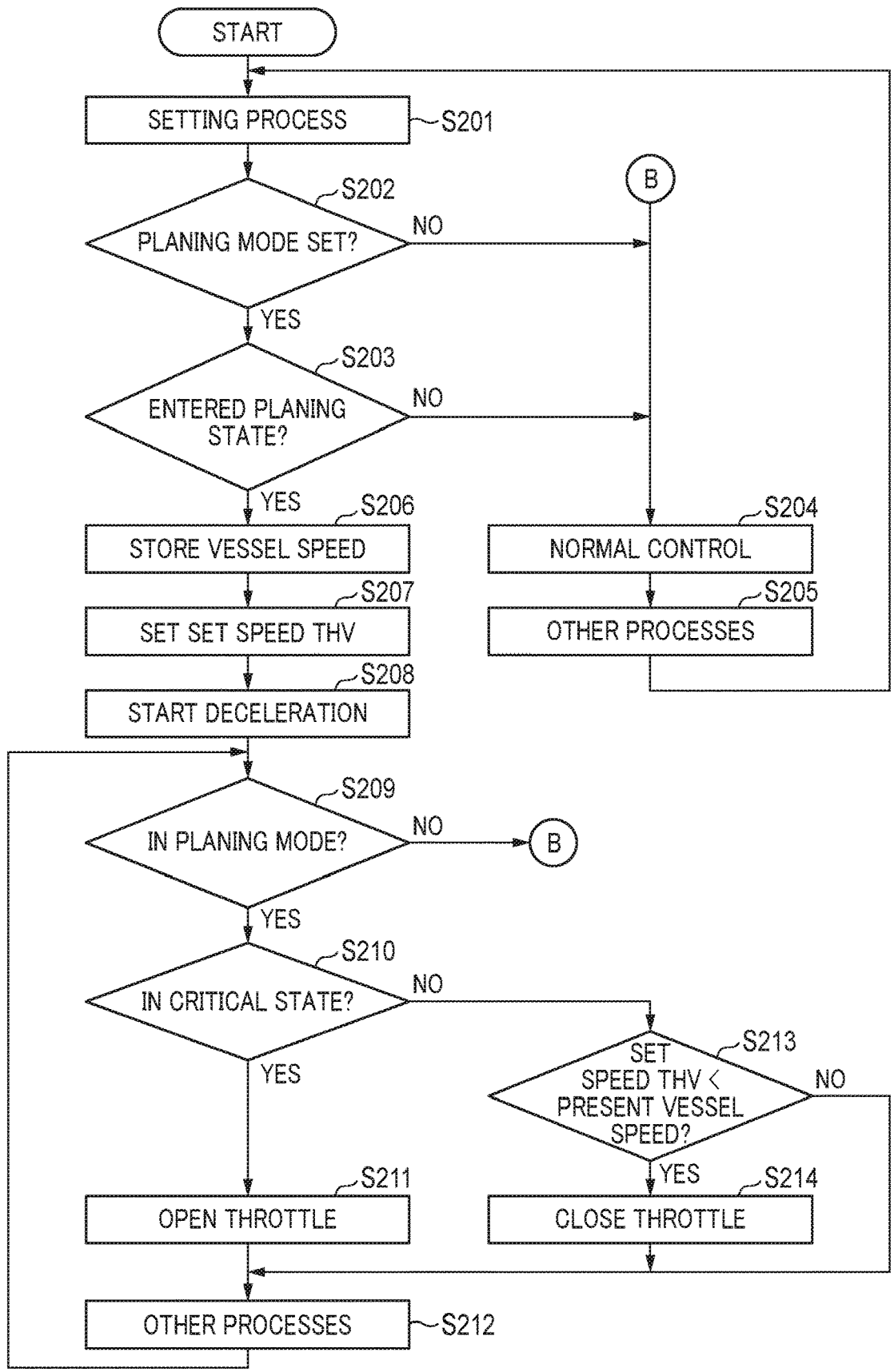
FIG. 6 is a flowchart of a throttle control process.

FIG. 6 is a flowchart of a throttle control process according to the present embodiment. This throttle control process is carried out on the same condition and by the same component as the one described with reference to FIG. 5. In steps S201 to 205, the CPU 31 carries out the same processes as those in the steps S101 to S105 in FIG. 5.

As a result of the determination in the step S203, when the hull 13 has entered the planing state, the process proceeds to step S206, in which the CPU 31 obtains the vessel speed V at the time when the hull 13 shifts from a state other than the planing state to the planing state, and then the CPU 31 stores the obtained vessel speed V in the RAM 33, which is an example of a storage unit. Then, in step S207, the CPU 31 sets a value based on the vessel speed V stored in the RAM 33 as the set speed THV. The stored vessel speed V is estimated to be a value close to the critical maximum speed V2, and hence the CPU 31 sets, for example, a value greater by a margin than the critical maximum speed V2 as the set speed THV.

It should be noted that in the step S206, when the planing mode is set in the state where the hull 13 is not in the planing state, the above-mentioned vessel speed V can be obtained. Namely, in a case where the process proceeds from the step S203 to the step S206 after proceeding from the step S203 to the step S204, the CPU 31 can obtain the above-mentioned vessel speed V. However, in a case where the planing mode is set after the hull 13 enters the planing state, the CPU 31 cannot obtain the above-mentioned vessel speed V. In this case, the CPU 31 sets a fixed value as the set speed THV in step S207. This fixed value is stored in the ROM 32 in advance. This fixed speed is a value obtained by, for example, adding a margin to a "value corresponding to the critical maximum speed V2", which is experimentally known in advance. As described above, since the critical maximum speed V2 varies with loads the hull 13 carries, the "value corresponding to the critical maximum speed V2" is a value obtained under average conditions. It should be noted that in the step S207, the fixed value may always be set as the set speed THV irrespective of the vessel speed V.

In step S208, the CPU 31 carries out the same process as in the step S106 in FIG. 5. In steps S209 to S214, a range from the critical maximum speed V2 to the set speed THV is set as a target range, and the throttle opening angle is adjusted so that the vessel speed V can fall within this target range. Namely, the set speed THV corresponds to an upper limit to a target range of the vessel speed V, which is targeted so as to maintain the planing state at low speed. First, in the steps S209 to S212, the CPU 31 carries out the same processes as those in the steps S107 to S110 in FIG. 5. When the CPU 31 determines in the step S209 that the planing mode is not applied, the process proceeds to the step S204. When the CPU 31 determines in the step S210 that the hull 13 is not in the critical state, the process proceeds to the step S213.

In the step S213, the CPU 31 obtains the present vessel speed V and determines whether or not the present vessel speed V is higher than the set speed THV (V>THV). In a state where the present vessel speed V is not higher than the set speed THV, the vessel speed V falls within the target range and the planing state at low speed is maintained, and thus the CPU 31 proceeds the process to the step S212. In a state where the present vessel speed V is higher than the set speed THV, the vessel speed V falls beyond the target range, and hence the process proceeds to the step S214, in which the CPU 31 carries out the same process as the one in the step S112 in FIG. 5. The process then proceeds to the step S212. It should be noted that in the step S212, a process in which the process returns to the step S204 when the hull 13 has entered the non-planing state is carried out in addition to the same process as the one in the step S110.

According to the present embodiment, as with the embodiment firstly described above, when it is judged that the hull 13 has shifted from the planing state to the critical state while the planing mode is applied, the opening angle adjustment unit 26 is controlled so as to increase the throttle opening angle. Also, in the present embodiment, when the present vessel speed V becomes higher than the set speed THV, the opening angle adjustment unit 26 is controlled so as to decrease the throttle opening angle. As a result, the vessel speed V is controlled to substantially fall within the target range between the critical maximum speed V2 and the set speed THV. Therefore, the same effects as those in the embodiment firstly described above can be obtained from the standpoint of maintaining the planing state at relatively low speed.

It should be noted that as described above, the vessel speed V stored when the hull 13 has shifted into the planing state is a value close to the critical maximum speed V2. Here, the throttle opening angle may be adjusted by setting the stored vessel speed V as the target speed of the hull 13. Alternatively, in the embodiment firstly described above, the throttle opening angle may be adjusted by setting the "value corresponding to the critical maximum speed V2", which is experimentally known in advance, as the target speed for the hull 13. In such cases, control can be performed in substantially the same manner as in the control performed in the embodiment firstly described above.

A description will now be given of further another embodiment of the present invention. The present embodiment differs from the embodiment secondly described above in that the set speed THV is varied according to the turning state of the hull and is identical with the embodiment secondly described above in the other features.

Figure 7:
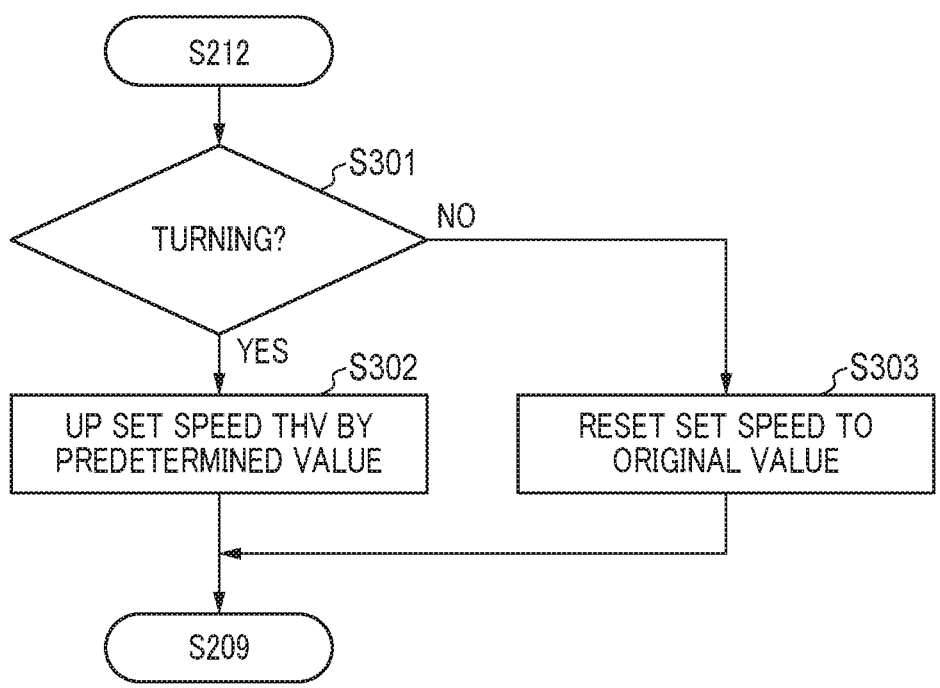
FIG. 7 is a part of the flowchart of the throttle control process.

FIG. 7 is a flowchart of a throttle control process according to the present embodiment. Processes in steps S301 to S303 are carried out immediately after the step S212 (the other processes) in FIG. 6. It should be noted that the processes in steps S301 to S303 may be carried out either immediately before the step S212 or as a part of the step S212.

First, in the step S301, based on a signal output from the posture sensor 38, the CPU 31 determines whether or not the hull 13 is turning. When the hull 13 is turning, the process proceeds to the step S302, in which the CPU 31 sets a new set speed THV (i.e. updates the set speed THV) by adding a predetermined amount to the present set speed THV (i.e. upping the present set speed THV). The CPU 31 then returns the process to the step S209. The reasons to increase the set speed THV will be described below.

One reason is that while the hull 13 is turning, there is a possibility that the pitch angle P and the vessel speed V cannot be accurately detected. Another reason is that when the vessel speed V is obtained using a GPS, there is a high possibility that the vessel speed V smaller (slower) than it actually is will be obtained. Therefore, increasing the set speed THV can avoid a state where the hull 13 is likely to shift from the planing state to the critical state.

As a result of the determination in the step S301, when the hull 13 is not turning, the process proceeds to step S303, in which the CPU 31 resets the set speed THV to the original value (that was set in the step S207). It should be noted that when the set speed THV has not been updated, this set speed THV is maintained. Then, the CPU 31 return the process to the step S209.

According to the present embodiment, the same effects as those in the embodiment secondly described above can be obtained from the standpoint of maintaining the planing speed at relatively low speed. Moreover, during the time that it is detected that the hull 13 is turning, the set speed THV is set to a larger value as compared to the time that it is not detected that the hull 13 is turning, and hence the planing state can be maintained at relatively low speed even while the hull 13 is turning.

It should be noted that the predetermined value added in the step S302 may be a fixed value. Alternatively, the amount of turn may be detected, and a value corresponding to the detected amount of turn may be added to the set speed THV in place of the predetermined value. In this case, the set speed THV appropriate to the state of turn can be set, and therefore, the planing state at low speed can be maintained irrespective of the extent to which the hull 13 turns.

A description will now be given of further another embodiment of the present invention. As compared to the embodiment firstly described above, the present embodiment focuses on a case where the throttle lever 12 is operated while the opening angle adjustment unit 26 is being controlled so as to keep the hull 13 in the planing state.

Figure 8:
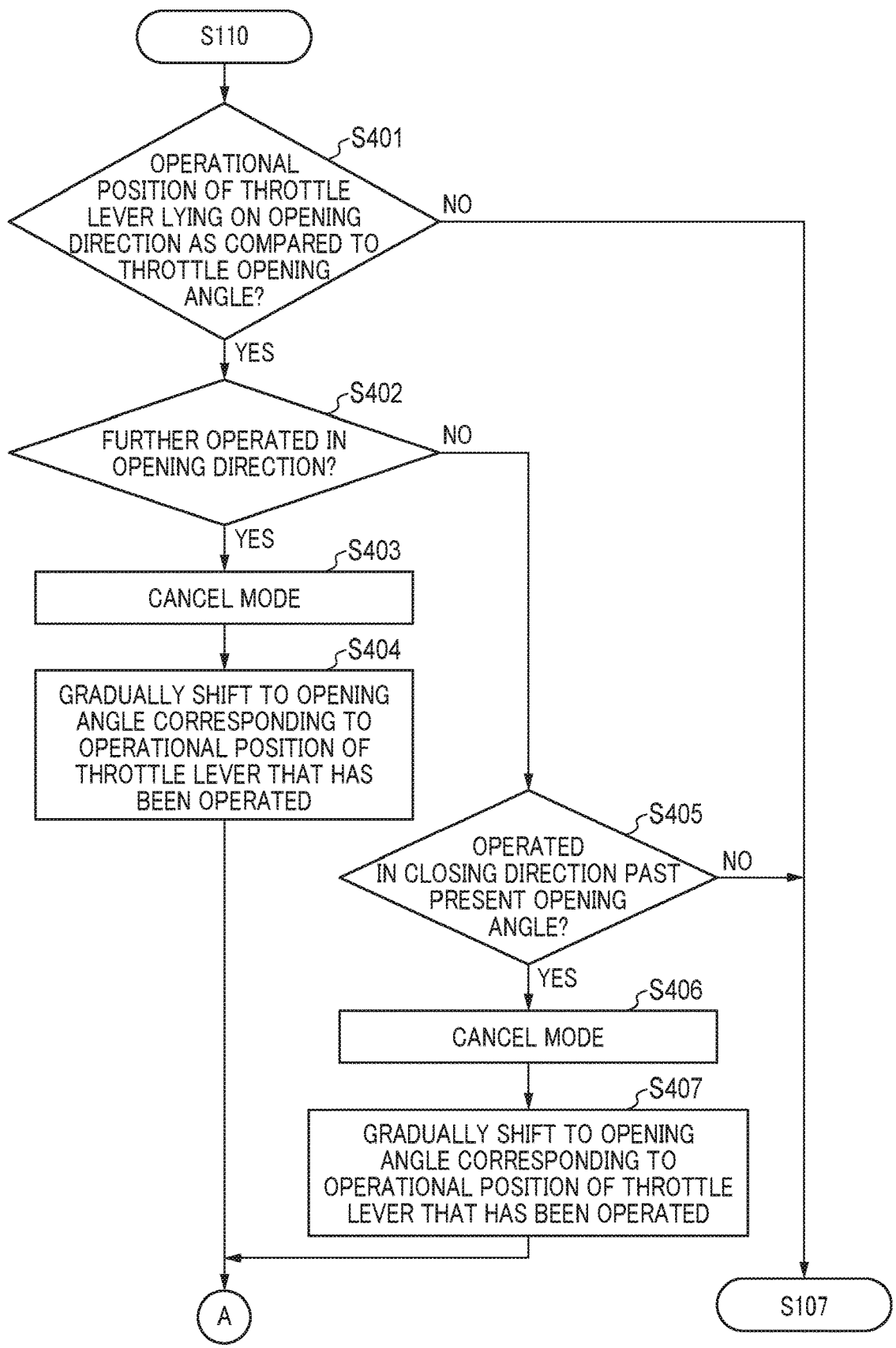
FIG. 8 is a part of the flowchart of the throttle control process.

FIG. 8 is a flowchart of a throttle control process according to the present embodiment. Processes in steps S401 to S407 are carried out immediately after the step S110 (the other processes) in FIG. 5. It should be noted that the processes in steps S401 to S407 may be carried out either immediately before the step S110 or as a part of the step S110.

In the step S401, the CPU 31 determines whether or not an operational position of the throttle lever 12 lies in an opening direction as compared to an operational position corresponding to a throttle opening angle under control (the present throttle opening angle). It should be noted that as described above, while the planing mode is applied, the operational position of the throttle lever 12 does not always correspond to an actual throttle opening angle. When the CPU 31 determines that the operational position of the throttle lever 12 lies in an opening direction as compared to the operational position corresponding to the throttle opening angle being controlled, the process proceeds to step S402, and when not, the process proceeds to the step S107. In the step S402, the CPU 31 determines whether or not the throttle lever 12 has been further operated in the opening direction as compared to the operational position corresponding to the throttle opening angle under control. When the CPU 31 determines that the throttle lever 12 has been further operated in the opening direction as compared to the operational position corresponding to the throttle opening angle under control, the process proceeds to step S403, and when not, the process proceeds to step S405.

In the step S403, it is judged that a vessel operator has an intention of shifting to a mode of a manual operation and starting acceleration, and therefore, the CPU 31 cancels the planing mode. Then, in step S404, the CPU 31 controls the opening angle adjustment unit 26 so that the throttle opening angle can gradually shift to the throttle opening angle corresponding to the operational position of the throttle lever 12 operated this time. The throttle opening angle under control is an opening angle corresponding to the critical maximum speed V2 or its vicinity, whereas the throttle opening angle corresponding to the operational position of the throttle lever 12 immediately after being operated in the opening direction can be sufficiently higher than the opening angle corresponding to the critical maximum speed V2 or its vicinity. In this case, if the throttle opening angle is immediately shifted to the one corresponding to the operational position of the throttle lever 12 after the operation this time, the hull 13 may be unintentionally rapidly accelerated. Thus, the speed of the hull 13 can be slowly changed by the throttle opening angle being gradually shifted to the throttle opening angle corresponding to the operational position of the throttle lever 12 after the operation. The gap between the operational position of the throttle lever 12 and the actual throttle opening angle is gradually eliminated.

In the step S405, the CPU 31 determines whether or not the throttle lever 12 has been operated in a closing direction past the (present) throttle opening angle under control. Namely, the CPU 31 determines whether or not the throttle lever 12 has been operated in the closing direction and also the operational position of the throttle lever 12 after the operation is lower than the operational position corresponding to the throttle opening angle under control. When the CPU 31 determines that the throttle lever 12 has been operated in the closing direction past the (present) throttle opening angle under control, the process proceeds to step S406, and when not, the process proceeds to the step S107.

In the step S406, it is judged that the vessel operator has an intention of shifting to the mode of manual operation and starting deceleration, the CPU 31 cancels the planing mode. Thus, after the operational position of the throttle lever 12 has become lower than the operational position corresponding to the throttle opening angle under control, the planing mode is canceled. Namely, the planing mode is not canceled in a stage where the throttle lever 12 has been operated in a closing direction within a range where its operational position does not become lower than the operational position corresponding to the throttle opening angle under control.

Then, in step S407, the CPU 31 controls the opening angle adjustment unit 26 so that the throttle opening angle can gradually shift to the throttle opening angle corresponding to the operational position of the throttle lever 12 after the operation this time. The throttle opening angle under control is an opening angle corresponding to the critical maximum speed V2 or its vicinity, whereas the throttle opening angle corresponding to the operational position of the throttle lever 12 immediately after being operated slightly in the closing direction is likely to be sufficiently higher than the opening angle corresponding to the critical maximum speed V2 or its vicinity. In this case, if the throttle opening angle is immediately shifted to the throttle opening angle corresponding to the operational position of the throttle lever 12 after the operation this time, the hull 13 may be likely to accelerate even though the vessel operator has an intention of decelerating the hull 13. Thus, after the operational position of the throttle lever 12 has become lower the operational position corresponding to the throttle opening angle under control, the planing mode is canceled and the throttle opening angle is gradually shifted to the throttle opening angle corresponding to the operational position of the throttle lever 12 after the operation, and whereby the speed the hull 13 can change slowly. The gap between the operational position of the throttle lever 12 and the actual throttle opening angle is gradually eliminated. After the step S404 or the step S407, the CPU 31 returns the process to the step S104 in FIG. 5.

According to the present embodiment, the same effects as those in the embodiment firstly described above can be obtained from the standpoint of maintaining the planing state at relatively low speed. Moreover, in a situation where the operational position of the throttle lever 12 lies in the opening direction as compared to the operational position corresponding to the throttle opening angle under control while the planing state at low speed is being maintained, when the throttle lever 12 is further operated in the opening direction, the CPU 31 cancels the planing mode and gradually shifts the throttle opening angle to the throttle opening angle corresponding to the operational position of the throttle lever 12 after the operation. This prevents unintended rapid acceleration. Also, in the above situation, when the throttle lever 12 is operated in the closing direction, after the operational position of the throttle lever 12 has become lower the operational position corresponding to the throttle opening angle under control, the CPU 31 cancels the planing mode and gradually shifts the throttle opening angle to the throttle opening angle corresponding to the operational position of the throttle lever 12 after the operation. As a result, a situation in which the hull 13 accelerates even though the throttle lever 12 has been operated in the closing direction can be avoided.

Appropriately lowering the tabs 21 of the trim tabs 20 can make it easier to maintain the planing state at low speed. For this purpose, in the embodiments described above, while the planing mode is applied, two tabs 21 may be controlled to be lowered by a predetermined amount.

For example, when the planing mode is set, the tabs 21 may be lowered even if the hull 13 has not entered planing state. In this case, referring to FIG. 5, for example, it may be considered to insert a step of lowering the tabs 21 between the step S102 and the step S103 and insert a step of raising the tabs 21 (putting them back to retracted positions) between a timing of the determination as NO in the step S107 and a timing of a return to the step S104. Referring to FIG. 6, it may be considered to insert a step of lowering the tabs 21 between the step S202 and the step S203 and insert a step of raising the tabs 21 between a timing of the determination as NO in the step S209 and a timing of a return to the step S204.

Alternatively, the tabs 21 may be lowered when both the condition that the planing mode is set and the condition that the hull 13 is in the planing state are satisfied. In this case, referring to FIG. 5, for example, a step of lowering the tabs 21 is inserted after the determination as YES in the step S103 and before the step S107. At the same time, a step of raising the tabs 21 (putting them back to the retracted positions) may be inserted after the determination as NO in the step S107 and before a return to the step S104. Referring to FIG. 6, a step of lowering the tabs 21 is inserted after the determination as YES in the step S203 and before the step S209. At the same time, a step of raising the tabs 21 may be inserted after the determination as NO in the step S209 and before the return to the step S204.

It should be noted that in the embodiments described above, whether or not the hull 13 is in the critical state is judged based on the vessel speed V and the pitch angle P in the steps S108 and S210. The method of judgment, however, is not limited to this example. For example, whether or not the hull 13 is in the critical state may be judged based on the vessel speed V and the engine rpm N. Alternatively, whether or not the hull 13 is in the critical state may be judged based on the vessel speed V and the throttle opening angle.

It should be noted that in a case where an operation that lowers the tabs 21 of the trim tabs 20 is performed in parallel with the control that maintains the planing state at low speed in the planing mode, the predetermined amounts used in the steps S106, S109, S112, S208, S211, and S214 may be set according to the amount by which the tabs 21 is lowered and/or the load the hull 13 carries.

It should be noted that interceptor tabs may be adopted as posture control tabs in place of the tabs 21. In the water, each of the interceptor tabs changes its position from a position at which it projects from a bottom surface (vessel's bottom) of the hull 13 to a retracted position above the bottom surface of the hull 13.

It should be noted that the number of outboard motors may be one or three or more. Also, the number of trim tabs may be three or more.

Marine vessels to which the present invention is applied are not limited to marine vessels equipped with outboard motors, but may be marine vessels equipped with other types of marine propulsion devices such as inboard/outboard motors (sterndrive or inboard motor/outboard drive) or inboard motors, and water jet drive.

The present invention is not limited to the specific embodiments described above, and various forms within the gist of the present invention are also included in the present invention. Some of the embodiments described above may be combined together as appropriate.

While the embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A control system for a marine vessel that has a propulsion device including an engine, the control system comprising:
    an opening angle adjustment device configured to adjust a throttle opening angle of the engine; and
    a controller including
        a computing device, and
        a non-transitory storage medium containing program instructions, execution of which by the computing device causes the controller to
            judge whether or not a hull of the marine vessel has entered a planing state,
            set a predetermined mode in which the planing state is maintained, and
            after determining that the predetermined mode is set and that the hull has entered the planing state, control the opening angle adjustment device to keep the hull in the planing state even when the hull has decelerated to have a speed lower than a vessel speed at a time when it is determined that the hull has entered the planing state.

2. The control system for the marine vessel according to claim 1, wherein the execution of the program instructions by the computing device further causes the controller to
    judge whether or not the hull is in a critical state, which is a state between the planing state and a non-planing state, and
    upon determining that the predetermined mode is set and that the hull has shifted from the planing state to the critical state, control the opening angle adjustment device to increase the throttle opening angle.

3. The control system for the marine vessel according to claim 2, wherein the execution of the program instructions by the computing device further causes the controller to
    upon determining that the predetermined mode is set and that the hull has shifted from the critical state to the planing state, control the opening angle adjustment device to decrease the throttle opening angle.

4. The control system for the marine vessel according to claim 2, wherein
    the critical state corresponds to a speed range of the hull, and
    the execution of the program instructions by the computing device further causes the controller to, upon determining that the predetermined mode is set and that the speed of the hull has exceeded a set speed higher than a maximum speed of the speed range, control the opening angle adjustment device to decrease the throttle opening angle.

5. The control system for the marine vessel according to claim 4, wherein
    the non-transitory storage medium stores thereon the vessel speed when it is determined that the hull has entered the planing state, and
    the controller sets the set speed based on the vessel speed stored in the non-transitory storage medium.

6. The control system for the marine vessel according to claim 4, wherein the set speed is a fixed value.

7. The control system for the marine vessel according to claim 4, wherein
    the controller detects a turning state of the hull, and upon determining that the hull is turning, sets the set speed to a value larger than a value of the set speed set when the hull is not turning.

8. The control system for the marine vessel according to claim 2, wherein the controller judges whether or not the hull is in the critical state based on the speed of the hull and a pitch angle of the hull.

9. The control system for the marine vessel according to claim 2, wherein the controller judges whether or not the hull is in the critical state based on the speed of the hull and a number of revolutions per unit time of the engine.

10. The control system for the marine vessel according to claim 1, wherein upon determining that the predetermined mode is set while the hull is in the planing state, the controller controls the opening angle adjustment device to gradually decelerate the hull.

11. The control system for the marine vessel according to claim 1, wherein
the marine vessel has a throttle operator for manually adjusting the throttle opening angle, the throttle operator being movable in an opening direction and a closing direction;
while the opening angle adjustment device is being controlled to keep the hull in the planing state, upon determining that an operational position of the throttle operator lies further in the opening direction than an operational position corresponding to the throttle opening angle under control, responsive to the throttle operator being further operated in the opening direction, the controller cancels the predetermined mode and controls the opening angle adjustment device so that the throttle opening angle gradually shifts to a throttle opening angle corresponding to an operational position of the throttle operator after said further operation.

12. The control system for the marine vessel according to claim 1, wherein
the marine vessel has a throttle operator for manually adjusting the throttle opening angle, the throttle operator being movable in an opening direction and a closing direction;
while the opening angle adjustment device is being controlled so as to keep the hull in the planing state, upon determining that an operational position of the throttle operator lies further in the opening direction than an operational position corresponding to the throttle opening angle under control, responsive to the throttle operator being operated in the closing direction, the controller cancels the predetermined mode after the operational position of the throttle operator moves past the operational position corresponding to the throttle opening angle under control, and controls the opening angle adjustment device so that the throttle opening angle gradually shifts to a throttle opening angle corresponding to an operational position of the throttle operator after said further operation.

13. The control system for the marine vessel according to claim 1, further comprising:
a posture control tab attached to a stern of the marine vessel and configured to control a posture of the hull; and
a trim tab actuator configured to drive the posture control tab, wherein
in response to the predetermined mode being set, the controller controls the trim tab actuator to lower the posture control tab.

14. The control system for the marine vessel according to claim 1, further comprising:
a posture control tab attached to a stern of the marine vessel and configured to control a posture of the hull; and
a trim tab actuator configured to drive the posture control tab, wherein
upon determining that the predetermined mode is set and the hull has entered the planing state, the controller controls the trim tab actuator to lower the posture control tab.

15. A marine vessel, comprising:
a hull;
a propulsion device including an engine; and
a control system including
an opening angle adjustment device configured to adjust a throttle opening angle of the engine, and
a controller including
a computing device, and
a non-transitory storage medium containing program instructions, execution of which by the computing device causes the controller to
judge whether or not the hull has entered a planing state,
set a predetermined mode in which the planing state is maintained, and
after determining that the predetermined mode is set and that the hull has entered the planing state, control the opening angle adjustment device to keep the hull in the planing state even when the hull has decelerated to have a speed lower than a vessel speed at a time when it is determined that the hull has entered the planing state.

16. A control method for a marine vessel that has
a hull,
a propulsion device including an engine and configured to give propulsive force to the hull, and
an opening angle adjustment device configured to adjust a throttle opening angle of the engine in the propulsion device,
the control method comprising:
judging whether or not the hull has entered a planing state; and
after determining that a predetermined mode in which the planing state is maintained is set and that the hull has entered the planing state, controlling the opening angle adjustment device to keep the hull in the planing state even when the hull has decelerated to have a speed lower than a vessel speed at a time when it is determined that the hull has entered the planing state.

* * * * *